United States Patent Office 3,523,970
Patented Aug. 11, 1970

---

3,523,970
PROCESS FOR PREPARING DIFLUOROUREA COMPOUNDS
Vytautas Grakauskas, Arcadia, Calif., assignor to Aerojet-General Corporation, Azusa, Calif., a corporation of Ohio
No Drawing. Filed Dec. 6, 1960, Ser. No. 75,070
Int. Cl. C07c 127/00; C01b 21/52
U.S. Cl. 260—543                                 2 Claims

ABSTRACT OF THE DISCLOSURE

This patent describes difluorourea compounds having the general formula:

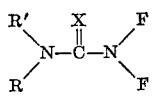

wherein R and R' are the same or different and are hydrogen, nitro, alkyl, cyano, nitroalkyl, nitroaryl or aryl radicals; and X is oxygen, sulfur or the imino radical; said compounds being prepared by the direct fluorination of the corresponding urea in the presence of a moderator, preferably water. The difluorourea compounds of the above fomula can be hydrolyzed in the presence of a mineral acid to form difluoroamine which is an oxidizing agent of general utility.

---

The invention relates to new intermediates, their method of preparation and use. In particular this invention relates to difluoro compounds having the generic formula:

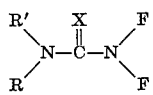

wherein R and R' are the same or different and are hydrogen, nitro, alkyl, cyano, nitroalkyl, nitroaryl or aryl radicals; and X is oxygen, sulfur or the imino radical.

Hydrolysis of my new difluoro compositions is easily effected to produce difluoramine. Difluoramine finds valuable use as an oxidizer and is especially well suited for use as the oxidizer in conventional liquid bipropellant rockets. When used for this purpose difluoramine is burned with such conventional fuels as hydrazine, kerosene-aniline mixtures and ethanol in a rocket engine combustion chamber. The gases thus produced are exhausted through the exhaust nozzle of the rocket engine to produce thrust. Difluoramine can be utilized in this fashion for rocket propulsion purposes by employing it as the oxidizer in the method taught in assignee's U.S. Pat. 2,771,739.

It is known that difluoramine may be obtained by reacting tetrafluorohydrazine with thiophenol or p-t-butylthiophenol, however, these reactions are subject to serious disadvantages. Tetrafluorohydrazine is very expensive, yields of difluoramine produced from tetrafluorohydrazine are low and very low reaction times are required.

An object of this invention is to provide a novel process for the production and use of a new intermediate whereby the above mentioned disadvantages of the prior art are avoided. Other objects and advantages will hereinafter appear.

To the accomplishment of the foregoing and related ends, said invention then comprises the features hereinafter fully described and particularly pointed out in the claims the following description and the illustrative examples setting forth in detail certain embodiments of the invention, these being indicative, however, of but a few of the various ways in which the principle of the invention may be employed.

The new compositions of this invention are prepared according to the following generic reaction:

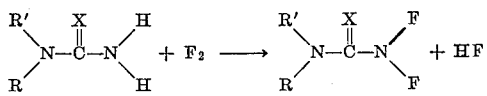

wherein R and R' may be the same or different radicals, and can be any of hydrogen, nitro, alkyl, cyano, nitroalkyl, nitroaryl or aryl radicals; while X can be oxygen, sulfur or the imino radical. Difluoramine can be prepared from these intermediates by simple hydrolysis in acid medium.

The examples which follow are submitted to illustrate and not to limit this invention.

EXAMPLE I

Preparation of N,N-difluorourea

A solution of 120 g. urea (2.0 moles) in 1600 ml. water was placed in a 2000 ml. three-necked round-bottomed reaction flask equipped with a stirrer, a thermometer and a gas-inlet-outlet tube. The solution was cooled to 0 to 50° C. by means of an ice-water bath and a stream of elemental fluorine (6 to 7 liters/hr.) diluted with nitrogen (10 to 14 liters/hr.) was passed into the vigorously stirred reaction mixture. The fluorination was continued for a period of 7 hrs. and during this time ca. 45 liters of fluorine gas were passed into the reaction mixture. The reaction temperature was kept at 0 to 5° C. throughout the run.

A 200 ml. aliquot of the aqueous solution (stored for 4 weeks at 0 to 5° C.) was extracted with twenty 75 ml. portions of ethyl ether. The oxidizing power of the original solution was found to distribute in both aqueous and organic phases during the course of the extraction. At the end of the extraction the aqueous solution still possessed some oxidizing power. The etheral extracts were combined and the combined solution was dried. The solution was filtered to remove inorganic salts and the clear filtrate was concentrated to ca. 100 ml. at atmospheric pressure. The residue was subjected to 20 to 25 mm. pressure at 25 to 30° C. to remove the rest of the solvent. When all the ether was removed, the liquid residue was distilled at 0.1 to 0.3 mm. and 20 to 25° C. About 5.0 g. of yet unidentified liquid, melting point < —78° C. was obtained. The pot residue, of this distillation, ca. 10 g. of light-yellow solid, was sublimed at 35 to 45° C. and 0.1 to 0.2 mm. pressure to yield 9.0 g. of white crystalline N,N-difluorourea, melting point about 43° C.

EXAMPLE II

Preparation of N,N-difluorourea solution

Into a 500-ml. round-bottomed three-necked flask equipped with a stirrer and gas inlet and outlet tubes was placed a solution of 18.2 g. urea (0.3 mole) in 400 ml. distilled water. The vigorously stirred mixture was cooled to 5–10° C. and into it was passed a stream of fluorine (2–3 liters/hr.) diluted with helium (10 liters/hr.). The reaction was continued for a period of six hours and during this time ca. 12–14 liters of fluorine gas was passed into the solution. The reaction was discontinued and the clear colorless solution (pH 2–4) was stored at 5–10° C.

EXAMPLE III

Preparation of difluoramine

Experimentally, difluoramine was generated from N,N-difluorourea as follows. To 100 ml. of cold, equeous difluorourea (corresponding to 0.125 mole of urea) was added, with stirring, 30 ml. of concentrated sulfuric acid and the resulting mixture was heated to 90 to 95° C. and kept at this temperature for a period of 30 minutes. The gases escaping from the reaction flask during the course of hydrolysis contained, in addition to difluoramine, an equal molar amount of carbon dioxide and traces of difluorodiazine. The liquid difluoramine is obtained by passing the mixture of the gases through a Dry Ice-acetone-cooled trap where the gaseous difluoramine, B.P. −23.6° C., condenses. Althuogh the other hydrolysis product, carbon dioxide, should not condense at this temperature, it was found that liquid difluoramine contains 20–30% of dissolved carbon dioxide. On the other hand, difluoramine obtained under similar reaction conditions but liquified at −50 to −55° C. contains lesser amounts (3–5%) of dissolved carbon dioxide.

On the basis of some thirty hydrolysis experiments, it was determined that the yields of difluoramine obtained upon the acid hydrolysis of difluorourea are 70±5% based on urea used for the preparation of the N,N-difluorourea. It was indicated above that the fluorination of urea given difluorourea in 65–70% yields and, therefore, the hydrolysis of aqueous difluorourea to difluoramine is practically quantitative.

Typical urea derivatives which can be used include 2,2,2 - trinitroethylurea, methylurea, N,N-dimethylurea, ethylurea, N,N-diethylurea, phenylurea, N,N-diphenylurea, benzylurea, N,N-dibenzylurea, propylurea, N,N-dipropylurea, butylurea, 2,2' - dinitro-N,N-diethylurea, N,N - dibutylurea, thiourea, guanidine, nitroguanidine, 2,2,2 - trinitroethylguanidine, methylguanidine, phenylguanidine, 5 nitro-N-hexylurea, N-methyl-N-phenylurea, N - butyl - N-methylurea, p-nitrophenylurea, hexylurea, N,N-dimethylguanidine, cyanourea, nitrourea, N-methyl-N-phenylguandine, 2,4-dinitro-N-butylthiourea, N,N- dinitrourea, N - nitro - N-methylurea, cyanothiourea, N-methyl-N-cyanoguanidine, N,N-dimethylthiourea, ethylthiourea, o,m-dinitrophenylguanidine, N-butyl-N-methylthiourea, N-methyl-N-nitrourea, anthrylurea, phenythiourea and nitrothiourea cyanoguanidine. Upon reaction with fluorine these urea derivatives form the corresponding unsymmetrical difluoro compound, thus, methylurea forms N - methyl-N',N'-difluorourea, 2,2,2-trinitroethylurea forms 2,2,2-trinitro-N-ethyl-N',N'-difluorourea, cyanoguanidine forms N - cyano-N',N'-difluoroguanidine, phenylurea forms N-phenyl-N',N'-difluorourea, thiourea forms N,N-difluorothiourea, N,N-dibutylurea forms N,N-dibutyl - N',N' - difluorourea, 6-nitro-N-hexyl-N-benzylthiourea forms 6 - nitro-N-hexyl-N-benzyl-N',N'-difluorothiourea, nitrourea forms N - nitro-N',N'-difluorourea, guanidine forms N,N-difluoroguanidine, N,N-dionoylguanidine forms N,N - dinonyl-N',N'-difluoroguanidine, N-nonyl-N-anthrylurea forms N-nonyl-N-anthryl-N',N'-difluorourea and N-naphthylurea forms N-naphthyl-N',N'-difluorourea. Urea is the preferred, embodiment because it is inexpensive, available in large quantities, relatively safe and easy to handle and store and the fluorination reaction with urea proceeds very smoothly.

Normally, only one specific compound will be fluorinated in any one operation, however, it is within the scope of this invention to fluorinate a mixture of urea and urea derivative or a mixture of various urea derivatives. Thus, urea and phenylurea can be fluorinated in the same solution and the fluorinated solution subjected to hydrolysis to produce difluoramine. Difluoramine can be produced using any urea or urea derivative containing the radical:

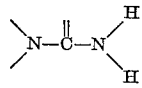

The character of the substituents attached to the open valences is not critical since they do not enter into the reaction. Any organic radical can be attached to the open valences on the nitrogen atom. Since the production of urea derivatives often yields a mixture of urea derivatives, the present process is particularly desirable because it does not require that the mixture of urea derivatives be purified before being fluorinated if difluoramine is to be produced from the fluorinated mixture.

The concentration of urea or urea derivative has no effect on the course of the reaction.

The fluorination reactions are carried out in an inert solvent in which the specific urea or urea derivative being fluorinated is at least partically soluble. The term inert soluvent wherever used throughout the specification and claims is intended to include, as well as complete solvents, liquids which will form only partial suspensions, wherein only a portion of the urea or urea derivative is completely dissolved. For example, a partial suspension of unsymmetrical di-n-butylurea in water is readily fluorinated. The inert liquid chosen is not critical, its function being merely that of an inert carrier and its selection being dependent upon such factors as cost, availability, inertness toward the reactants or the products, the ease with which the fluorinated products are separated from it and its solvent characteristics for the reactants and the fluorinated products. Water is the preferred inert solvent because of its low cost and ready availability, however, lower aliphatic alcohols such as ethanol and methanol have been found to give very good results. It is very surprising that fluorination reactions can be carried out in lower aliphatic alcohols since the introduction of fluorine into lower aliphatic alcohols would normally be expected to cause fires and explosions, but the fluorination reactions were found to proceed very smoothly in lower aliphatic alcohols. Other typical inert solvents which work well include carbon tetrachloride, methylene chloride, chlorobenzene, dimethylformamide and mixture thereof.

The temperature at which these fluorination reactions are carried out is not critical. Since it is desirable to keep the temperature as low as possible when working with fluorine and extremely low temperatures are difficult and uneconomical to achieve and maintain, the preferred temperature of reaction is between −10° C. and 40° C.

Unsymmetrical difluoro urea and urea derivatives are quite stable and can be stored in solution for months at room temperature or below without decomposition. The purified unsymmetrical difluoro compounds of this invention are stable to decomposition and can be stored for considerable periods of time, but they are generally not purified since in this state they are sensitive to impact and very toxic. N,N-difluorourea is soluble in water and its aqueous solution can be stored for months at 0–5° C. in glass without significant decomposition.

N,N-difluorourea possesses a strong oxidizing power and readily liberates iodine from an aqueous potassium iodide solution. Pure N,N-difluorourea is a white crystalline solid with a melting point of about 43° C. The compound exerts a high vapor pressure at room temperature and can be readily sublimed at 25–35° C. at atmospheric pressure. N,N-difluorourea is hygoscopic and is soluble in water and in practically all organic solvents. The material can be recrystallized from benzene.

Unsymmetrical difluoro urea and urea derivatives are important intermediates for preparation of other compounds. Unsymmetrical difluoro compounds undergo hydrolysis in the presence of a mineral acid at elevated temperatures to yield (HNF$_2$) and other reaction products. Thus, for difluorourea the reaction is:

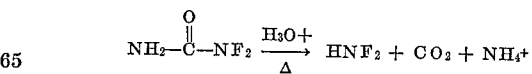

For N,N-difluoro-N',N'-dimethylurea the reaction is:

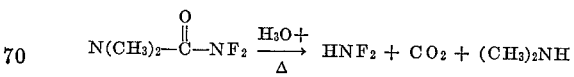

These hydrolysis reactions take place very slowly at room temperature. At 45–50° C. the rate of hydrolysis is still relatively slow. At about 60° C. the rate of hydrolysis becomes economically practical. At the preferred temperature of about 80° C. to about 95° C. the hydrolysis reaction is complete in about 20 to 25 minutes. Hydrolysis may be carried out in either a liquid or vapor acid medium. The acid employed is not critical, any acid either organic or inorganic can be used. Typical acids include sulfuric, nitric, hydrochloric, phosphoric, arsenic, carbonic and sulfurous.

Unsymmetrical difluoro compounds are also very useful materials for the preparation of other N-F compounds. Aqueous N,N-difluorourea, for example, reacts with an aqueous solution of sodium hydroxide and sodium hypochlorite to yield a mixture of tetrafluorohydrazine and chlorodifluoramine.

Difluoramine is a very good oxidizing agent of general utility, for example, the action of difluoramine on hydrazine is similar to that of hydrogen peroxide.

The method of this invention can be carried out in a batch or continuous process. For example, urea may be fluorinated and reactions carried through to the production of difluoramine in one smooth continuous operation.

It will be understood that various modifications may be made in this invention without departing from the spirit thereof or the scope of the claims.

I claim:

1. The method of preparing unsymmetrical difluorourea compounds having the general formula:

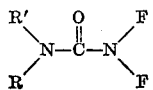

which comprises reacting fluorine with the urea compound having the general formula:

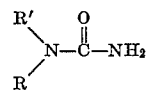

in water; therein in the above formulae, R and R' are hydrogen or alkyl.

2. The method of preparing N,N-difluorourea which comprises reacting fluorine with urea in water.

References Cited

UNITED STATES PATENTS

| | | | |
|---|---|---|---|
| 3,395,179 | 7/1968 | Lawton et al. | 260—543 |
| 3,347,913 | 10/1967 | Leary et al. | 260—553 |
| 3,228,936 | 1/1966 | Davis et al. | 260—553 X |
| 3,228,747 | 1/1966 | Groves et al. | 23—356 |
| 2,950,312 | 8/1960 | Quadflieg | 260—553 X |
| 2,477,872 | 8/1949 | Haury | 260—553 |
| 2,407,161 | 9/1946 | Kaiser et al. | 260—551 |
| 2,155,328 | 4/1939 | Paquin | 260—552 X |

OTHER REFERENCES

Simons: "Fluorine Chemistry," vol. 1, copyright 1950, Academic Press Inc., pp. 420–422.

EDWARD J. MEROS, Primary Examiner

U.S. Cl. X.R.

23—356